United States Patent
Fritzsch (10) Patent No.: US 12,059,643 B2
(45) Date of Patent: Aug. 13, 2024

(54) ELECTROMAGNETIC PRIMING OF MOLTEN METAL FILTERS

(71) Applicant: PYROTEK, INC., Spokane, WA (US)

(72) Inventor: Robert Fritzsch, Trondheim (NO)

(73) Assignee: Pyrotek, Inc., Spokane, WA (US)

(*) Notice: Subject to any disclaimer, the term of this patent is extended or adjusted under 35 U.S.C. 154(b) by 600 days.

(21) Appl. No.: 17/278,615

(22) PCT Filed: Sep. 20, 2019

(86) PCT No.: PCT/US2019/052162
§ 371 (c)(1),
(2) Date: Mar. 22, 2021

(87) PCT Pub. No.: WO2020/061459
PCT Pub. Date: Mar. 26, 2020

(65) Prior Publication Data
US 2022/0040612 A1    Feb. 10, 2022

(51) Int. Cl.
*B01D 37/02* (2006.01)
*B01D 39/00* (2006.01)

(52) U.S. Cl.
CPC .......... *B01D 37/02* (2013.01); *B01D 39/00* (2013.01)

(58) Field of Classification Search
CPC ........ B01D 37/02; B01D 39/00; B22C 9/086; C22B 9/003; C22B 9/023
See application file for complete search history.

(56) References Cited

U.S. PATENT DOCUMENTS

| | | | |
|---|---|---|---|
| 5,722,480 A * | 3/1998 | Asai | B22D 11/115 164/466 |
| 9,605,332 B2 | 3/2017 | Kennedy et al. | |
| 2007/0022841 A1* | 2/2007 | Todaro | C22B 9/023 75/407 |

(Continued)

FOREIGN PATENT DOCUMENTS

| | | | | |
|---|---|---|---|---|
| CA | 2678169 A1 * | 3/2011 | | C03B 5/021 |
| CN | 207818337 U | 4/2018 | | |

(Continued)

OTHER PUBLICATIONS

International Search Report for PCT Application No. PCT/US2019/052162, mailed Jan. 10, 2020.

(Continued)

*Primary Examiner* — Chester T Barry
(74) *Attorney, Agent, or Firm* — Lippes Mathias LLP (57) ABSTRACT

According to one aspect of the present disclosure, a method of priming a ceramic filter element for removal of solid inclusions from liquid metal is provided. The filter element is contained in a filter box and at least two separate inductors are placed on opposed sides of the filter element. The method includes the steps of a) applying an excitation current to the inductors, b) adding sufficient liquid metal to cover an upstream side of the filter element, c) allowing the current induced in the liquid metal by the inductors to create Lorentz forces which press upon and stir the liquid metal such that the liquid metal is forced into the ceramic filter element, hence priming the filter element, and d) discontinuing the excitation current once a predetermined degree of priming has been obtained.

19 Claims, 7 Drawing Sheets

(56) References Cited

U.S. PATENT DOCUMENTS

2011/0309555 A1* 12/2011 Bullesfeld ............. C30B 11/007
                                                              264/486
2015/0322543 A1* 11/2015 Kennedy ................. C22B 9/003
                                                              75/10.14

FOREIGN PATENT DOCUMENTS

JP           7-166253     *  6/1995  ............... C22B 9/00
JP        2006176883 A       7/2006

OTHER PUBLICATIONS

Fritzsch et al., "Electromagnetic Priming of Ceramic Foam Filters (CFF) for Liquid Aluminum Filtration", Light Metals 2013, pp. 973-979.

* cited by examiner

ELECTROMAGNETIC PRIMING OF MOLTEN METAL FILTERS

BACKGROUND

The present exemplary embodiment relates to electromagnetic priming of molten metal filters. However, it is to be appreciated that the present exemplary embodiments are also amenable to other similar applications.

Filters are currently used to purify liquid metal by removal of solid inclusions. These solid inclusions can lead to physical defects in the final metal products if not removed prior to solidification.

Before effective filtering of molten metal can be performed, the filter material should be wetted (primed) by the liquid metal. Wetting can be challenging because metals such as aluminum have high surface tension and high wetting angles. Surfaces of the filter which are not wetted are less likely to be active during filtration causing reduced filter efficiency. More particularly, incomplete wetting can result in locally higher liquid velocities in the active parts of the filter, higher operational pressure drops or lower total liquid metal throughput, and lower collection efficiency for the solid inclusions. The significance of priming in filtration is disclosed in a number of patents such as U.S. Pat. Nos. 4,081,371 and 4,872,908, the disclosures of which are herein incorporated by reference.

Filters can be preheated by burners to try to improve the flow of metal into the filter media and, hence, the priming efficiency for a fixed metal height over the filter. However, difficulties can be encountered in obtaining uniform heating without localized overheating that can lead to thermal damage of the filter media.

U.S. Pat. No. 9,605,332 (the disclosure of which is herein incorporated by reference) teaches an apparatus and method for priming a non-electrically conductive filter. In one embodiment, the ceramic filter media is surrounded by a low frequency induction coil. The coil is positioned to generate Lorentz forces which act to cause heated metal to impinge on the upper surface of the filter element. This design, however, suffers from drawbacks including destruction of the ceramic and high vibration.

The present disclosure provides a system and method for ceramic filter priming which minimizes those drawbacks.

BRIEF DESCRIPTION

Various details of the present disclosure are hereinafter summarized to provide a basic understanding. This summary is not an extensive overview of the disclosure and is neither intended to identify certain elements of the disclosure, nor to delineate scope thereof. Rather, the primary purpose of this summary is to present some concepts of the disclosure in a simplified form prior to the more detailed description that is presented hereinafter According to one aspect of the present disclosure, a method of priming a filter element for removal of solid inclusions from liquid metal is provided. The filter element is contained in a box or launder and an inductor(s) is placed on a side of the filter element. The method includes the steps of a) applying an excitation current to the inductor(s), b) adding sufficient liquid metal to cover an upstream side of the filter element, c) allowing the current induced in the liquid metal by the inductor to create Lorentz forces which stir the liquid metal such that the liquid metal is pressed into the filter element to prime the filter element, and d) discontinuing the excitation current once a predetermined degree of priming has been obtained. The electromagnetic forces can also be employed at the end of a filtration cycle to help remove residual metal in the filter, improving total weight yield.

BRIEF DESCRIPTION OF THE DRAWINGS

The invention consists in the novel parts, construction, arrangements, combinations and improvements, shown and described. The accompanying drawings, which are incorporated in and constitute a part of the specification illustrate one embodiment of the invention and together with the description, serve to explain the principles of the invention.

DETAILED DESCRIPTION

Various aspects of the present invention relate to: (1) a method of priming molten metal filters, without the use of externally applied mechanical or ultrasonic vibrations, vacuum or gas, by using one or multiple separate inductors to prime one or several filter elements; (2) a method of improved priming of filters, such as ceramic foam filters with small 'window' size, e.g. 15-80 PPI commercial ceramic foam filters, in order to operate with higher efficiency and produce a metal product containing fewer inclusions; (3) a method of priming which allows thicker than traditional filters or a stack of filters to be primed; and (4) an apparatus that allows previously used filter media to be reheated and subsequently reused.

Figure 1:
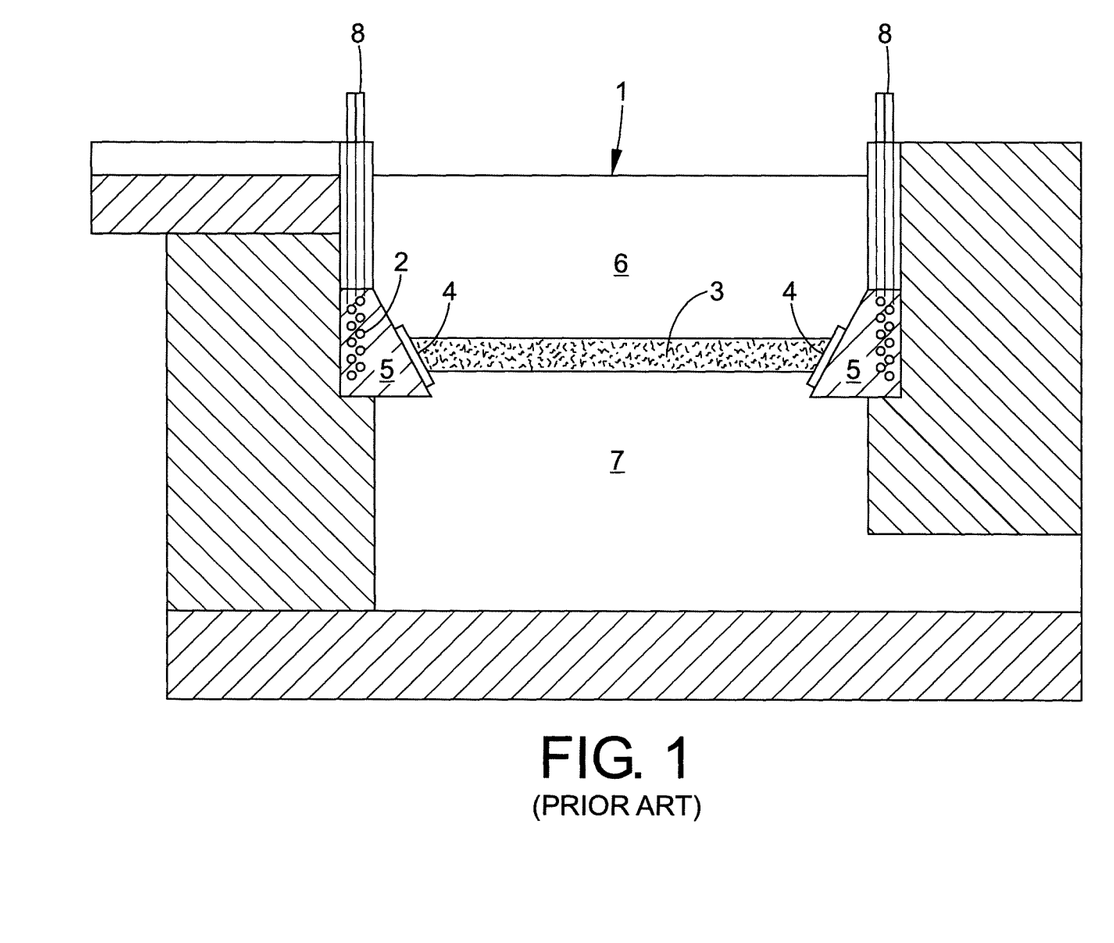
FIG. 1 is a schematic illustration of a prior art filter box.

FIG. 1 shows a conventional filter bowl 1 as typically used with ceramic foam filters (see U.S. Pat. No. 9,605,332 and an induction coil 2. A two layer induction coil 2 is shown in FIG. 1. A ceramic foam filter element 3 is installed within the induction coil 2. Gasket material 4 prevents leakage of the liquid metal around the filter 3. Thermal insulation is provided by refractory material 5. Sufficient refractory material can be present to avoid the contact of the hot metal in the upper portion of the bowl 6 or discharge portion of the bowl 7 with coil 2 or with the coil leads 8. A suitable cooling media (organic or water) can be used in combination with coil leads 8 and coil 2, to prevent electrical or thermal overheating and damage to the electrical conductors.

The prior art design of FIG. 1 has proven effective in laboratory scale environments. The present disclosure is directed to a suitable industry scale configuration. Particularly, the prior art coil design can limit the filter size as the coil has to surround the filter element. This requires inductors that are very long per turn, requiring high current densities generating high resistive heat losses and thereby requiring a large amount of heat to be removed from the coil. Since the coils are long, very high pressure/strong pumps are required to cool the coils. Larger systems can also encounter very inefficient inductors with very high inductivities.

In one embodiment of the present disclosure, the apparatus for priming a filter includes a filter element configured to receive a liquid metal flow; a coil(s) on at least one side of the filter element and configured to produce a magnetic field; and electromagnetic shielding surrounding an exterior of the coil(s). It is contemplated that ceramic filters, bonded particle filters, deep bed filters and other suitable filter media may be employed.

Throughout the following illustrations, it is noted that although a simple coil configuration is depicted, the disclosure also contemplates induction coils, pancake coils, and buss bars, etc.

For prolonged refractory life and for ensuring safe filter handling, the filter housing refractory and the filter(s) may be preheated by conventional means such as gas burner or electric heater, both with forced or natural convection. This avoids thermal shock and wear and reduces the risk of freezing the metal in the swan neck/return leg.

The present disclosure contemplates using a continuous current (AC or pulsed DC) applied to the coil during priming. Once the filter media is substantially filled with metal, the excitation of the coil is stopped. Thereafter, conventional casting procedures can be used.

In another embodiment of the invention, a suitable used filter element can be reused until its capacity to remove inclusions is completely exhausted. A suitable used filter element can be reused by applying a period of inductive heating prior to priming with liquid metal by fully draining them from metal by using the priming coil or by maintaining the filter filled with liquid metal between casts by using continuous induction heating. In one aspect, an excitation current higher than 60 Hz is advantageously used. This embodiment utilizes a dual frequency power supply, which could optionally be combined with a second coil specifically designed for the melting operation.

The present disclosure can use non-conductive filters such as alumina, zirconia, mullite, spinell or other minerals or electrically conductive filters such as silicon carbide. In addition, the filters can be plates or filters in the shape of tubes, bonded particle filters (BPF) or deep bed filters (large filtration length).

The power supply can be an adjustable solution and could electrify the specific coils generating a strong enough magnetic field within the filters and in proximity thereto to create EM vibration in the molten metal at the surface of the filter(s) besides the induced Magneto-Hydro-Dynamic (MHD) velocity field.

Figure 2:
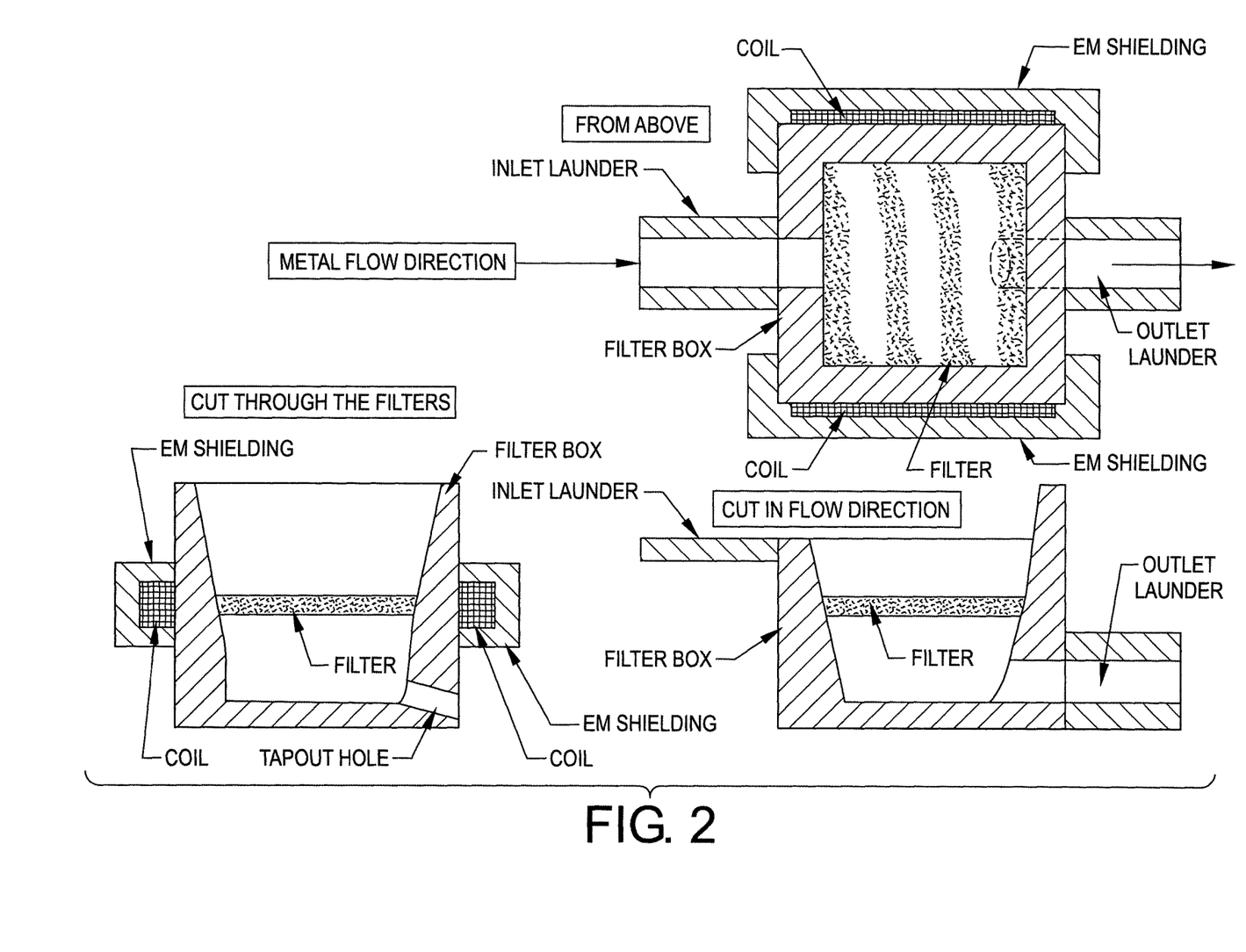
FIG. 2 are schematic illustrations (including cross-sectional end and side views) and a top view of a filter box in accord with the present disclosure.

Turning now to the embodiment of FIG. 2, a filter box configuration is provided with two distinct coils located on opposed sides of the filter box. As used herein, distinct means that each coil receives electrical power independent of the other coil. This includes the concept of independent power supplies and/or use of a common power supply in combination with a system to provide separate phases. A power supply rectifier with controllable switching is also contemplated to provide adjustable frequency DC current on the different inductors, generating a rotating magnetic field.

With an AC or pulsed DC field, Lorentz forces are provided within and proximate to the filter. A 0-60 Hertz pulse width/phase shift can be used to achieve a suitable and desirable penetration depth.

The sides of the filter box including the metal inlet launder and the metal outlet launder do not include coils. This configuration contrasts with the design in FIG. 1 wherein a single induction coil surrounds all four sides of the filter. By using a single coil on one side of the filter or separate coils on opposed sides of the filter, the present configuration can prime the filter by inducing an alternating magnetic field. The filter box is formed of a pre-cast refractory, providing physical protection and integrity of the system, usually made of fused silica or alumina, but in some cases also silicon carbide. In certain environments, a fiber reinforced fused silica (stainless steel/carbon fibers) may be used. Thermal insulation such as a cast-able wool, insulation boards or micropore systems can surround the refractory. A freeze plane, such as a steel shell, can surround the whole system while an insulation window allowing the EM field to release the flux towards the area of intensity can be cut in front of the coil into the steel body. The window(s) can be filled with a non-conductive refractory as a metal barrier. The coil can be protected by solid and/or castable rubber to avoid vibrations and wear and to physically stabilizing the coil. Surrounding the coil, a flux guiding system, which also assures the EMC certification of the equipment consisting of mild steel sheets can be provided. A final layer around the whole body of the coil and the flux guide can be a mild steel shell, providing physical protection for a cast house environment.

The magnetic field of the two distinct coils induces eddy currents in the metal sitting on the filter which interact with the induced magnetic field to produce powerful Lorentz forces. The Lorentz forces can cause magnetohydrodynamic forces and electromotive vibrations of the metal, establishing impingement onto the surface of the filter element wherein the momentum of the impinging metal forces metal into the filter for priming.

Magnetic fluxes on the magnitude of 1 mT to 70 mT are contemplated. A peak power of 0.5 T at the surface or corners of the filter may be desirable. A lesser power would be expected at regions of the filter remote from the coils. This can be achieved by pulsing DC current or synchronizing AC current over the coil(s). In one aspect of the disclosure, the frequency of the coil excitation current is between greater than 0 and 65 Hz, for example between 45 and 60 Hz.

The electrical conductors of the coil(s) can have many different shapes. For example, flat, round, tubular, rectangular, or square. Unlike traditional induction furnace coils, the coils of the present disclosure need not be constructed for low electrical resistance. A higher current density can be advantageously used (e.g. >50 A/mm$^2$) resulting in proportionately smaller diameter conductors that can provide more turns in a given height of coil, with a corresponding increase in the magnetic field strength.

Alternatively, if a copper section thickness is enhanced, the resistance of the coil can be reduced by providing a larger area for current flow, simultaneously to reducing the frequency to adjust the penetration depth. This would allow the current density to increase while reducing the cooling requirements. Accordingly, in certain embodiments, the use of larger cross-section, lower resistance coils with adjusted turns and current density ratio to increase the magnetic field in the center of the filter may be desirable. Single, double or more layers of coils can be used advantageously.

The filter apparatus can be round, square or rectangular in section without deviating from the purpose of this disclosure. A rectangular shape has the advantage that the overall filter area can be maximized, while minimizing the width that the magnetic field must penetrate. A rectangular shape can eliminate the need to use frequencies below the line frequency (45 to 60 Hz) as the penetration depth is sufficient to reach the third penetration depth into the metal during the priming stage, generating a substantial priming effect.

The orientation of the coil and filter elements can be either vertical or horizontal, provided a path is made available for gas to escape during priming. However, the EM field helps the air to get through and out of the filters during the priming action. This suppresses the common issue of floating filters by the use of the EM field during priming. Accordingly, the addition of the subject coil(s) makes filter positioning easier and less detrimental.

The present disclosure further contemplates using a longer coil or multiple coils for a deep bed filtration medium, e.g. thicker than 150 mm. This allows a greater filter thickness to be used, increasing filtration area.

The large coils can also be used to produce induction heating within the filter element(s) by connecting the power to a small subsection of a single large inductor, otherwise used for EM field generation to prime the filters or as a separate induction coil. This would allow heating residual metal within the filterbox inbetween castings, remelting of the metal within the filter after/prior the filtration stage, to preheat a conductive unused filter section, and/or to add sequential heat into the metal during casting, helping the metal in the filtration box to remain liquid.

It is also feasible to drive molten metal in one or both directions through the filter using the present EM priming methodology. The initial metal flow of the designed system requires the coil to be positioned in the described manner to generate sufficient priming pressure. After priming, the flow direction could be reversed.

The present inventive embodiment is advantageous because preheating of the filter is not required for priming. Nonetheless, experience has shown that to ensure a long refractive lifetime, mechanically strong filters and to avoid thermal shock, heating may still be recommended.

By using an EM field generated by the filter priming coils, the filters can be drained after each casting operation. This can remove large fractions of the remaining metal from the filters, further increasing the metal yield and also improving the handling of the used filter elements, reducing the overall waste and loss experienced by the casting process, directly positively contributing to the Health, Safety and Environment (HSE) aspects.

Figure 3:
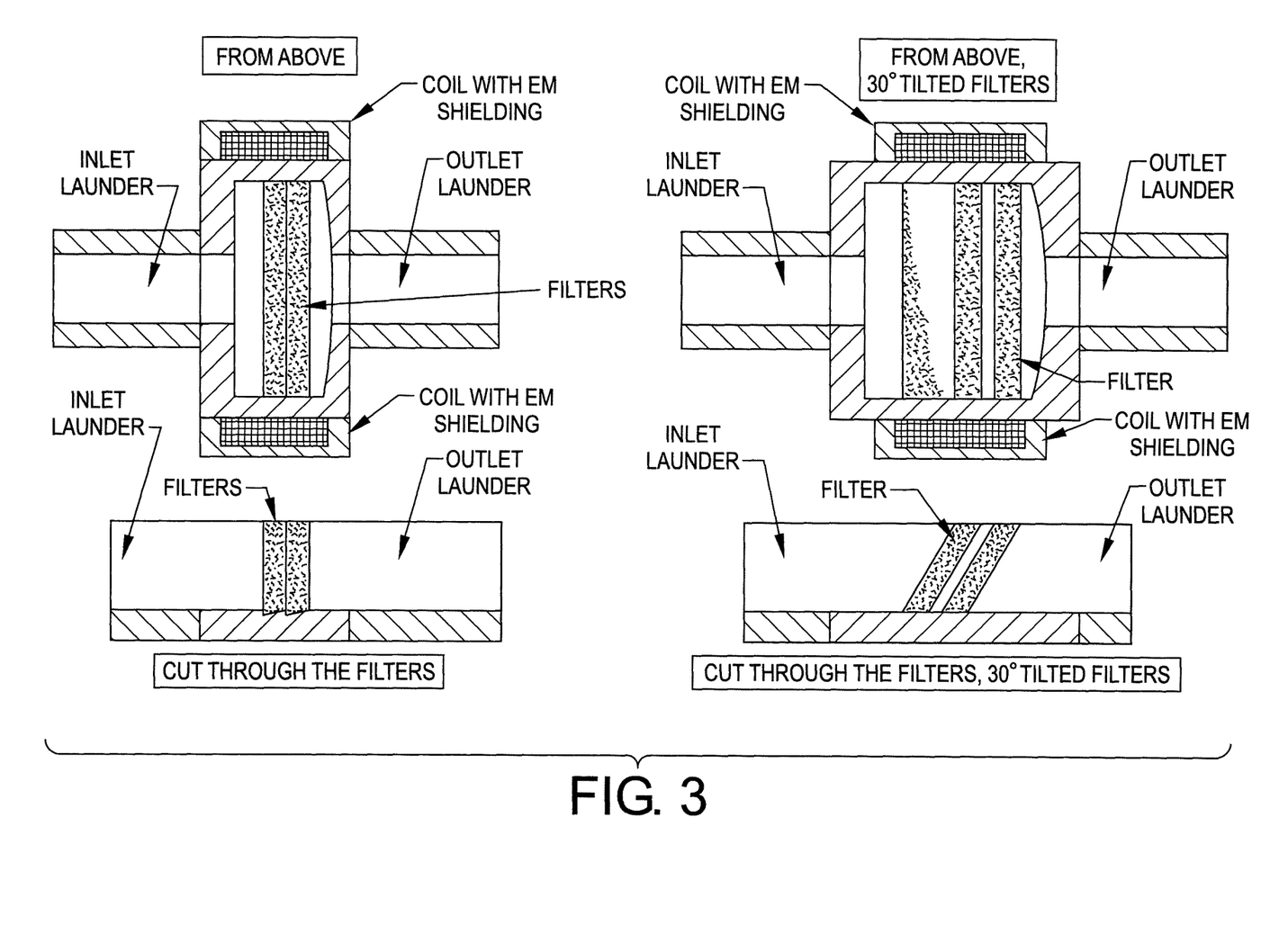
FIG. 3 are schematic illustrations (top and side cross-sectional views) of a first vertical multiple filter plate configuration and a second inclined vertical multiple filter plate configuration.

In FIG. 3, two embodiments of a filter box including vertically oriented filter plates are depicted. In a first embodiment, the plates are vertical while in the second embodiment, the plates are inclined about 30°. In these embodiments, the coils or opposed sides of the filters will be similarly vertically oriented.

Figure 4:
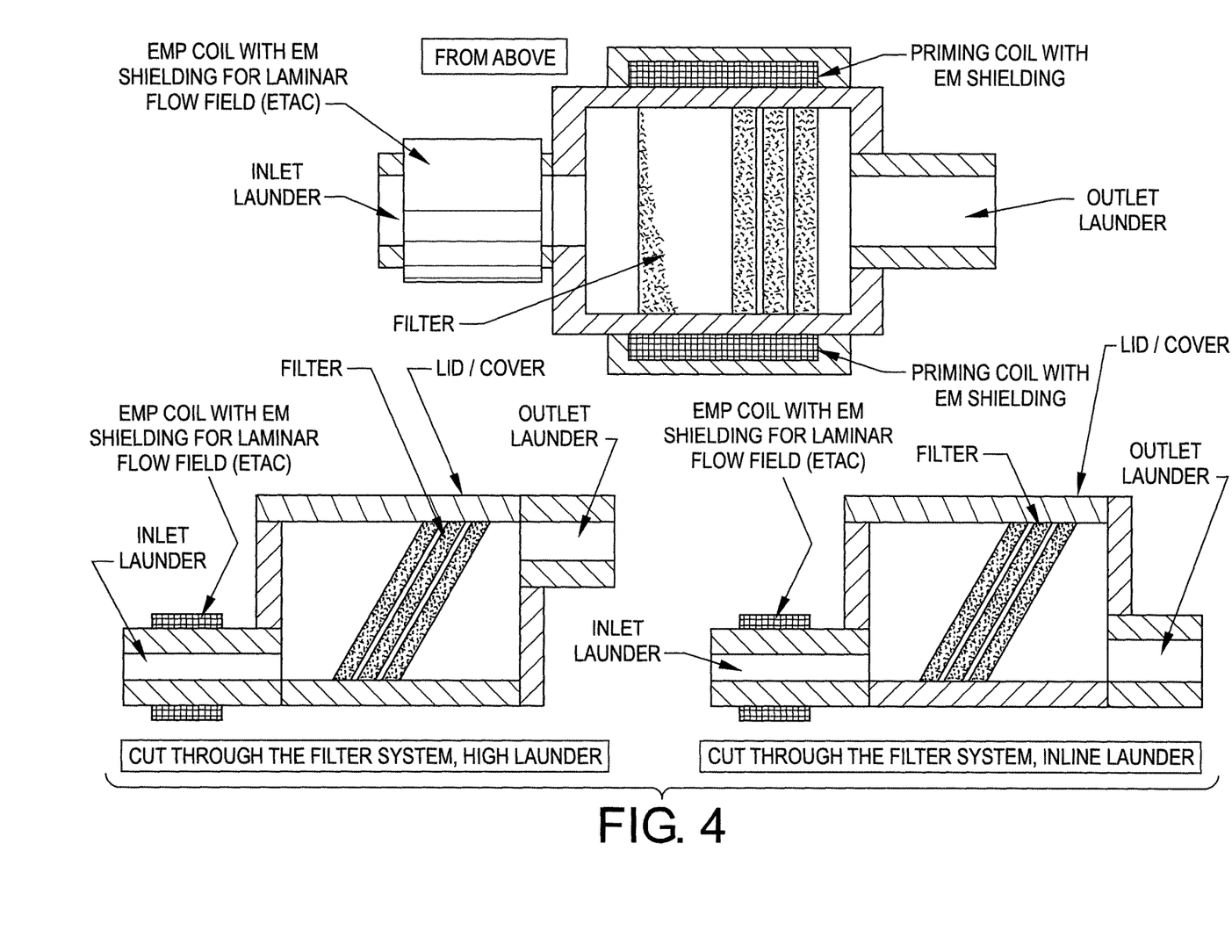
FIG. 4 are schematic illustrations (top and cross-sectional side views) of inclined multiple filter plate configurations including a first configuration having a raised launder discharge and second configuration with an in-line launder discharge.

Referring now to FIG. 4, inclined filter plates and vertically oriented coils are depicted in a first embodiment with a raised downstream launder and a second embodiment with an in-line downstream launder. The embodiment of FIG. 4 further includes and inductor introducing the molten metal to the filter box.

Figure 5:
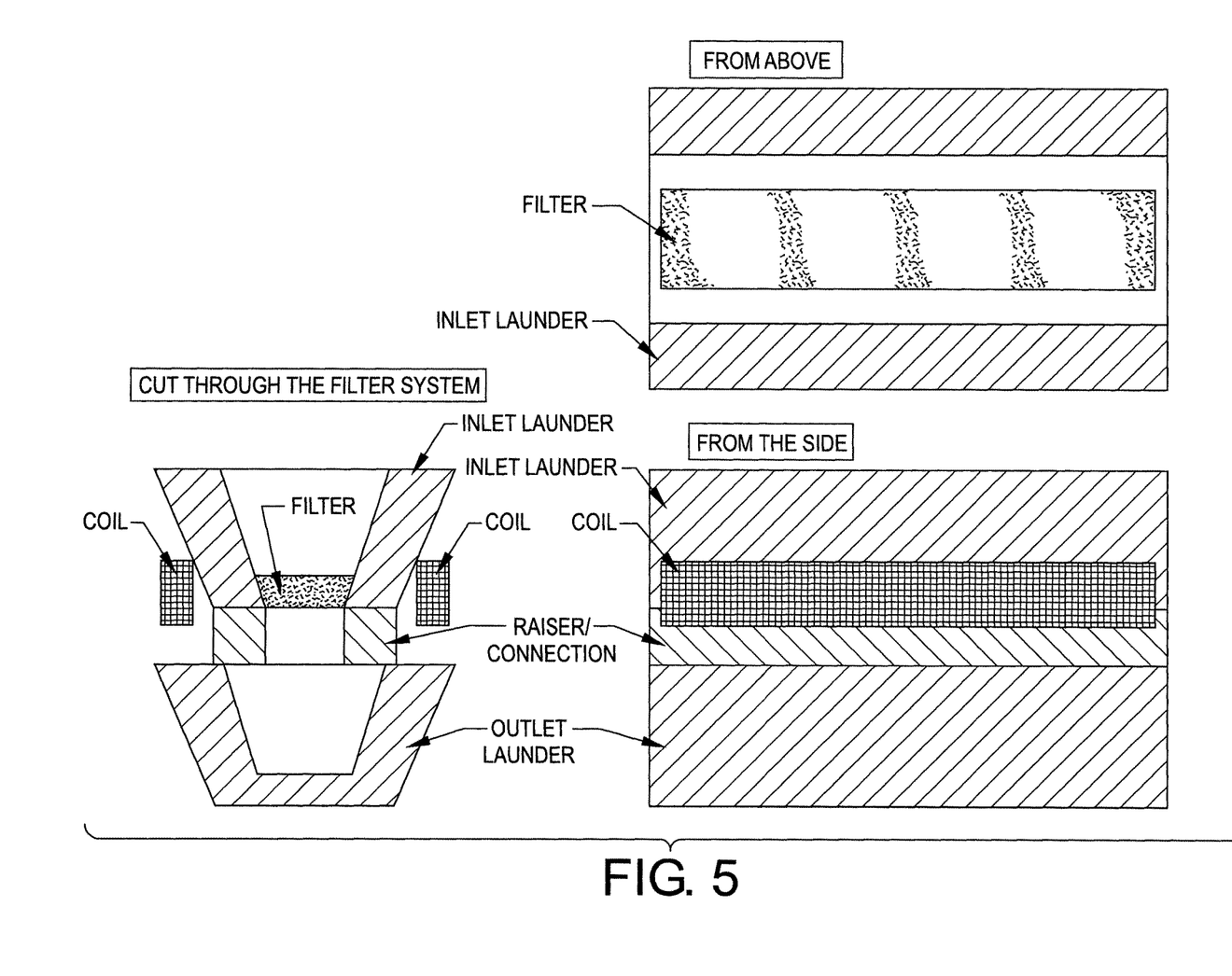
FIG. 5 are schematic illustrations (end cross-sectional view and top and side views) of a filter inclusive launder version of the present disclosure.

According to the embodiment of FIG. 5, a filter is inserted in a bottom of a launder such that the launder serves as a filter bowl. Steelwork and insulation material would be provided around the launder. In certain embodiments, the coils can be separated from the filter by insulation and steel. The launder elements can be of typical design styles, but an inlet launder is located above an outlet launder in at least one overlapping location. A raiser/connection can be provided in the overlapping location. The filter element can be of a rectangular configuration to coincide with the channel of the launder. For example, the filter can have a length at least two times, or at least four times, its width. Inductors having a length generally corresponding to the filter length are placed on the long, opposed sides of the filter in the inlet launder base.

Figure 6:
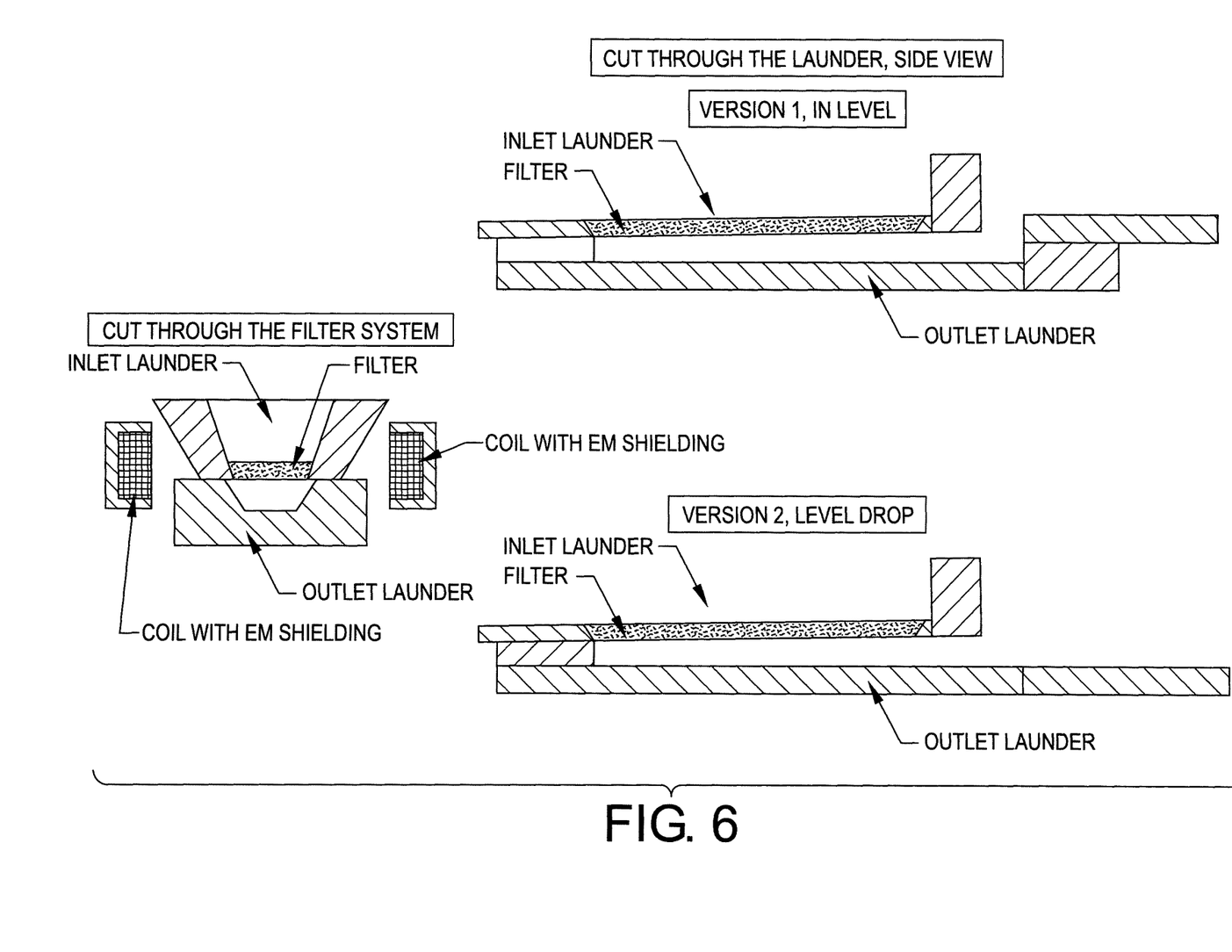
FIG. 6 are cross-sectional schematic illustrations (end and side cross-sectional views) of a alternative filter inclusive launder system in accord with the present disclosure including a first in-line configuration and a second drop configuration.

Turning now to the embodiments of FIG. 6, an alternative launder filtration system is illustrated wherein the distance between the bottom surface of the filter and the outlet launder has been minimized. This can help avoid unwanted turbulence. In the version 1 embodiment, a step has also been included in the outlet launder. The step can encourage molten metal to fill the launder area below the filter, rising to adjacent the bottom surface of the filter, to further reduce a waterfall effect that can cause turbulence.

Figure 7:
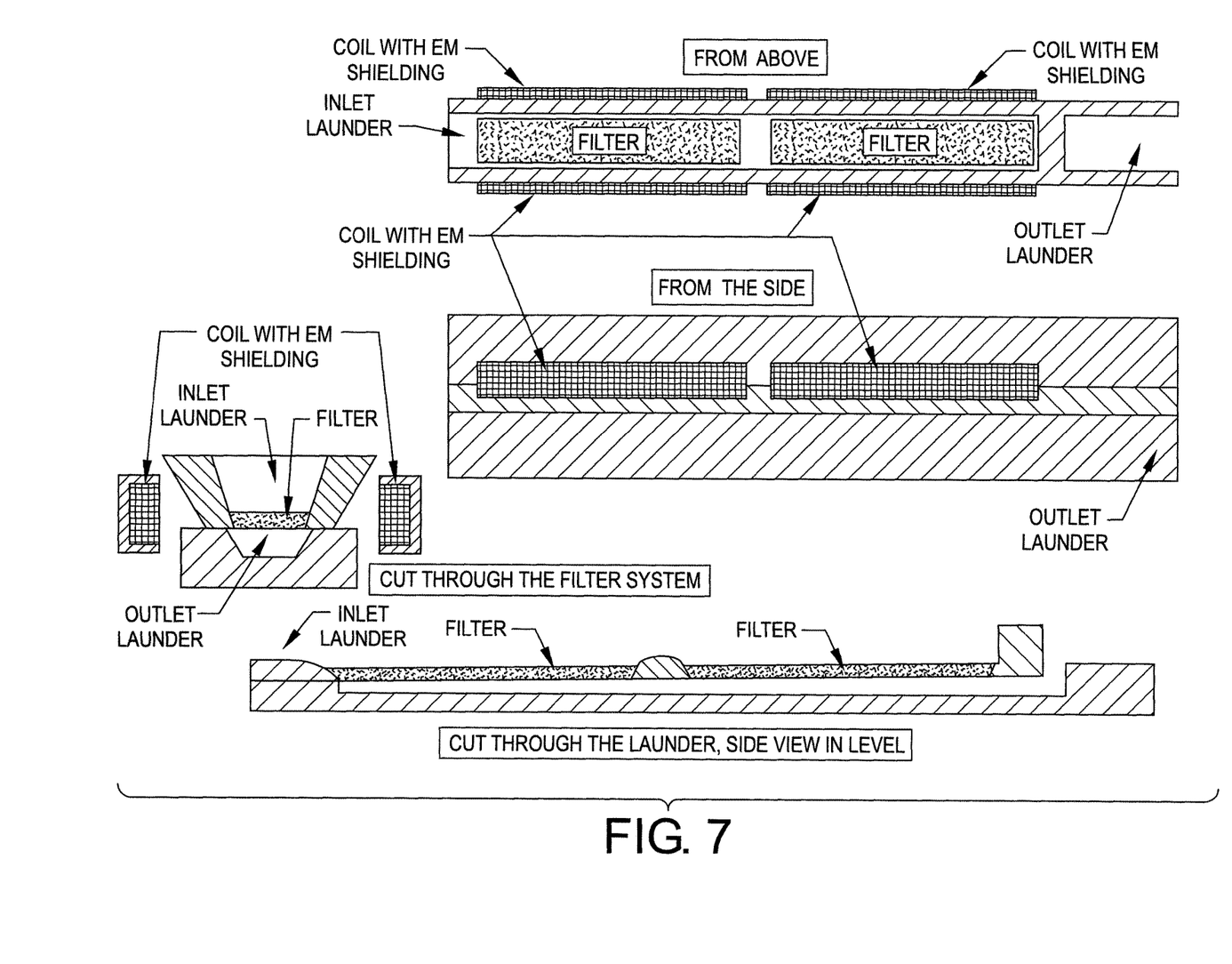
FIG. 7 are schematic illustration (cross-sectional end and side views and top and side views) of an alternative filter inclusive launder system.

Turning now to FIG. 7, since long thin filters tend to break, several standardized rectangular filters maybe utilized. A larger filtration area can be achieved by using several filter segments. The *** of the illustration signifies that the launder/coil arrangement can be of any length suitable for delivering a desired throughput. The coils can be one pair of independent coils for each filter.

In operation, the inlet launder can receive molten metal from a furnace via a pump or ladle, as examples. The inductors can be activated to improve priming of the filter. Thereafter, molten metal can flow through the inlet launder, pass through the filter and be received in the outlet launder for discharge, for example to a casting apparatus.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A method of priming a filter element, said filter element configured for removal of solid inclusions from liquid metal, wherein said filter element is contained in a box or launder and at least two inductors are placed symmetrically on opposed sides of the filter element, each of said inductors receiving electrical power independent from the other, said method comprises: a) applying an adjustable AC or pulsed DC excitation current to the at least two inductors, b) adding liquid metal to cover an upstream side of the filter element, c) allowing the currents induced in the liquid metal by the inductors creating a variable magnetic field to create Lorentz forces which stir the liquid metal such that the liquid metal is forced into the filter element, priming the filter element, and d) discontinuing the excitation current once a predetermined degree of priming has been obtained.

2. The method of claim 1 wherein only two separate inductor coils on opposed sides of the filter element are employed.

3. The method of claim 1 wherein molten metal can be directed to flow either upwardly or downwardly through the filter element.

4. The method of claim 3 wherein said coil includes at least two turns of a wire forming said coil either above or below a plane of a top or bottom surface of the filter element.

5. The method of claim 1 wherein said coils include electromagnetic shielding.

6. The method of claim 1 wherein said filter element is conductive.

7. The method of claim 1 wherein said coils are connected in series or in parallel and phase adjusted to complement one another.

8. The method of claim 1 wherein said filter comprises one of an open well structure, a bed filter structure, and/or a sieving geometry.

9. The method of claim 8 wherein the filter element is comprised of silica bonded alumina or zirconia, SiC, graphite, phosphate bonded alumina, silica bonded titanium dioxide, mullite, spinel zirconium dioxide, graphene coated material.

10. The method of claim 1 wherein the filter element is comprised of at least one tube filter.

11. The method of claim 1 wherein the filter element comprises a bonded particle filter.

12. The method of claim 1 wherein coils have multiple coil geometrics.

13. The method of claim 1 wherein the pulsed DC is variable and switching.

14. A method of filtering molten metal comprising inserting a filter between a launder upper section and a launder lower section and priming said filter using two separate plate inductors placed at the long sides of the filter.

15. The method of claim 1 wherein the sides of the filter box including a metal inlet and a metal outlet do not include inductors.

16. The method of claim 1 wherein the inductors are used in combination to perform inductive heating prior to priming.

17. A method of filtering molten metal wherein a filter is oriented vertically and separate inductors are disposed on at least two sides of the filter.

18. The method of claim 17 wherein said vertical filter is disposed in a launder.

19. The method of claim 17 wherein multiple vertical filters are dispersed in a filter box.

* * * * *